United States Patent [19]

McLean

[11] 4,414,884
[45] Nov. 15, 1983

[54] COFFEEMAKER WITH COFFEE SPREADER

[75] Inventor: James O. McLean, Milford, Conn.

[73] Assignee: General Electric Company, New York, N.Y.

[21] Appl. No.: 356,856

[22] Filed: Mar. 10, 1982

[51] Int. Cl.³ ............................................ A47J 31/057
[52] U.S. Cl. ...................................................... 99/304
[58] Field of Search ................ 239/124, 193; 99/293, 99/294, 295, 300, 301, 304, 305, 306, 307, 314, 315, 467, 473, 474, 483, 516

[56] References Cited

U.S. PATENT DOCUMENTS

| 1,003,317 | 9/1911 | Bargallo . | |
|---|---|---|---|
| 1,528,601 | 3/1925 | Bozzalla | 99/315 |
| 1,952,752 | 3/1934 | Haines . | |
| 3,793,934 | 2/1974 | Martin | 99/304 X |
| 4,070,956 | 1/1978 | Brown | 99/304 |
| 4,103,603 | 8/1978 | Bergmann et al. | 99/294 |

FOREIGN PATENT DOCUMENTS 2741719  3/1979  Fed. Rep. of Germany ........ 99/300

*Primary Examiner*—Philip R. Coe
*Assistant Examiner*—Arthur D. Dahlberg
*Attorney, Agent, or Firm*—John F. Cullen; George R. Powers; Leonard J. Platt

[57] ABSTRACT

An electric coffeemaker is disclosed of the drip type with an upright C-shaped housing, the lower leg having a heated carafe support and the upper leg having a water spreader over a supported coffee basket. The vertical leg encloses a reservoir with an apertured bottom wall and a cover is provided over the upper leg with an opening to the reservoir, and with a pump and heating chamber in the lower leg with a connected tube delivering hot water to the spreader. In this known combination, an improvement is provided in the spreader of an open cup-shaped member having a raised cut-away side towards the reservoir and connected to the tube. Apertures in the cup dispense hot water to the coffee basket and overflow structure is provided in the cup. The cover has ribs on its undersurface coextensive with and making a closure over the spreader and cut-away side and forms a passage away from the spreader to vent steam whereby the spreader is closed and vented by the cover to reduce condensing and dripping at the spreader. Additionally, the coffee basket has scalloped edges on its supporting flanges that slide on rails in the bottom of the upper leg for only spaced vertical wall contact between said flanges and rails to reduce capillary action along the rails and flanges.

9 Claims, 4 Drawing Figures

COFFEEMAKER WITH COFFEE SPREADER

BACKGROUND OF THE INVENTION

1. Field of the Invention

The invention pertains to an electric coffeemaker of the drip type wherein water is heated within a housing and pumped to a spreader to discharge into a supported carafe. The present invention is directed to an improved spreader assembly and coffee basket support to reduce condensation and subsequent dripping.

2. Description of the Prior Art

In an electric drip coffeemaker, it has been common practice to provide a generally C-shaped molded plastic housing with a lower horizontal leg holding a heated carafe and the other upper horizontal leg forming an overhanging top wall above the carafe and containing a spreader for dripping water through a supported coffee brew basket into the carafe. The vertical leg contains an internal water reservoir and the lower leg a heating chamber which supplies heated water through the water spreader and into the coffee basket. This coffeemaker has widely replaced percolator types and an arrangement of this general type is shown in U.S. Pat. No. 3,968,740 of common assignment. Various spreader structure has been proposed including one with overflow means to bypass the heated water into the coffee basket when the spreader becomes full as shown in U.S. Pat. No. 4,070,956 of common assignment.

Because of the pumping nature of such drip coffeemakers, there is a tendency for steam or vapor to be pumped over into the spreader where it condenses and drips when the brewing is finished and the coffee basket is removed. Various venting is provided to remove accumulated vapors and return them with the latent heat directly to the reservoir as shown in U.S. Pat. No. 4,103,603.

The spreader is usually separate structure from the overall coverplate as in U.S. Pat. No. 4,070,956 supra and it is desired to simplify and use fewer parts to reduce condensation and leaking. The present invention uses the cover over the coffeemaker also to enclose the top of the spreader and vent accumulated vapors directly back toward the reservoir to reduce condensation and it scallops the coffee basket to avoid capillary action in an arrangement that actually reduces the number of parts shown in said U.S. Pat. No. 4,070,956 patent supra while improving the operation.

It is a primary object of the invention to provide an improved water spreader in a coffeemaker which uses parts of the coffeemaker housing to complete the spreader while venting it such as to the reservoir.

Another object is to improve the coffee basket support to reduce capillary action of condensed liquid to further reduce leakage problems.

It is a further object of the invention to provide a water spreader improvement using fewer parts than heretofore by applying the housing cover for multiple functions of covering the housing, covering the spreader, and forming vent passages back and toward the reservoir.

SUMMARY OF THE INVENTION

In accordance with the invention, an electric drip-brewing coffeemaker has an upright C-shaped housing with the lower horizontal leg having a heated carafe support and the upper leg having a water spreader over a supported coffee basket. The vertical leg encloses a reservoir with an apertured bottom wall and a cover is supplied over the upper leg with an opening to the reservoir. A pump and heating chamber are disposed in the lower leg with a connected tube delivering hot water to the spreader. To this general arrangement, an improvement is provided in the spreader using an open cup-shaped member having a raised cut-away side directed towards the reservoir and connected to the tube. Apertures in the cup dispense hot water to the basket which is supported by flanges sliding on rails in the upper leg under the cover. Overflow means is disposed in the cup and ribs are provided on the cover coextensive with and making a closure for the spreader and the cut-away side to form a vented passage means away from the spreader. The coffee basket flange support structure is scalloped to reduce capillary action of condensed water. The entire combination provides a spreader that is closed and vented by the adjacent cover to reduce condensing and dripping. Thus, the main object of the present invention is to provide an improved spreader structure and basket support that uses the present cover for multi-functions all arranged to reduce condensing and dripping.

DESCRIPTION OF THE PREFERRED EMBODIMENT

Figure 1:
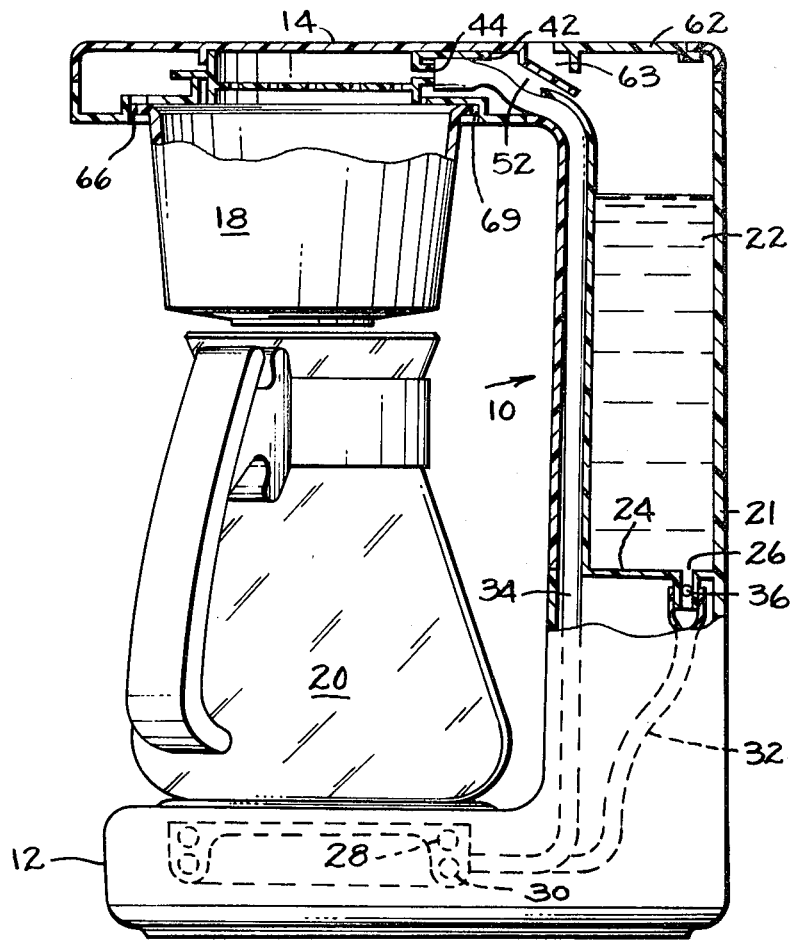
FIG. 1 is an elevational view partially in cross-section showing the cover and venting structure.
Figure 2:
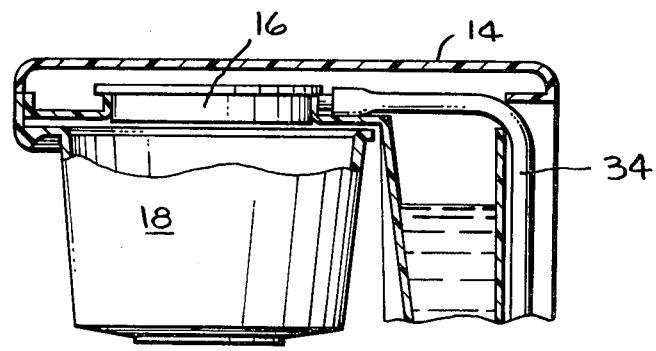
FIG. 2 is a partial view of conventional spreader/cover structure.

Referring to FIG. 1 and substituting FIG. 2 therein, there is shown an electric thermostat-controlled drip coffeemaker which generally includes a molded plastic upright C-shaped housing 10 with a lower horizontal leg 12 forming a support for receptacles such as a heated carafe and with the corresponding upper horizontal leg 14 containing a water spreader 16 and extending over the lower leg so that a coffee basket 18 and carafe 20 are supported therebetween in conventional fashion. The third portion or vertical housing leg 21 encloses water reservoir 22 in the upper portion thereof which reservoir is accessible through a lid at the top through which water is poured into the reservoir to start the coffee making operation. To store contained water, reservoir 22 has a bottom wall 24 with a central aperture 26. Water is heated by a sheathed electric resistance heater 28 disposed in the lower horizontal leg portion and positioned above water tube 30 for heating water in the tube and for maintaining an appropriate temperature or "keeps warm" feature for brewed coffee in carafe 20. Water is directed from reservoir 22 through aperture 26 into the hot water generator through tube means 32 into base tube 30 where it is boiled to form a pump action in tube 30 and delivered by separate connected tube 34 up into the spreader 16 as hot water to drip into the coffee basket 18 and then to carafe 20 as brewed coffee.

Generally check valves, such as 36, may be supplied either at the reservoir outlet or the hot water generator outlet (not shown) or both to act as one-way valves. Such structure, with slight variations, is standard in most of the molded plastic coffeemakers and, as thus far described, is conventional.

Generally, current drip coffeemakers have excessive steaming which is carried from the hot water generator through the connected tube and into the spreader. The excessive steaming leads to condensation leaks and long brew times and, in some cases, low brew temperatures. Arrangements to eliminate steaming and possible vapor locks is disclosed in application Ser. Nos. 06/181,955 now U.S. Pat. No. 4,356,382 and 181,996 now U.S. Pat. No. 4,361,750 both filed Aug. 28, 1980 of common assignment. The present invention is another form to eliminate problems caused by steaming and condensation leaks.

Figure 3:
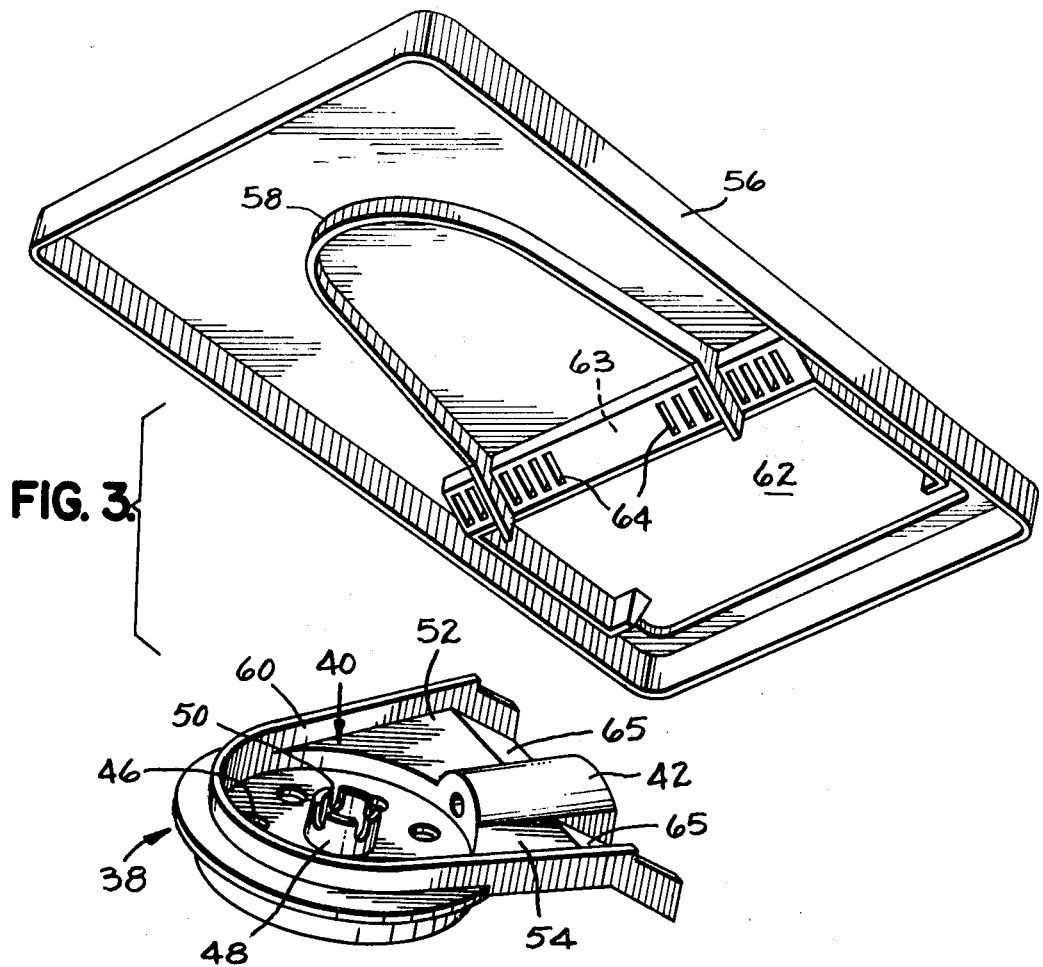
FIG. 3 is an exploded perspective view of the cover and cup-shaped spreader.
Figure 4:
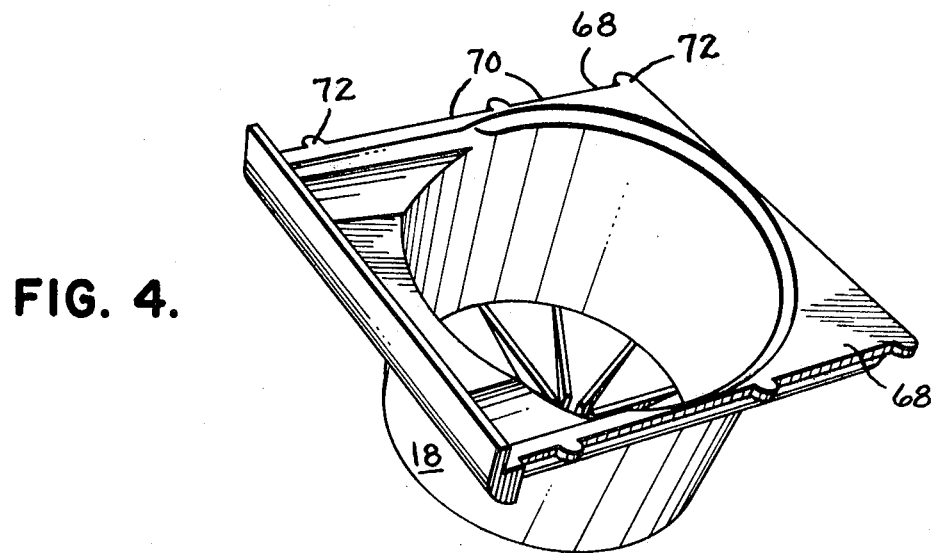
FIG. 4 is a perspective view of the scalloped coffee basket.

To this end, the invention offers an improvement in the spreader which comprises a generally circular open cup-shaped member 38 shown in FIG. 3 which, for directing steam, has a raised cut-away side 40 directed toward the reservoir 22 and connected to the tube 34 by an enclosed portion 42 centrally of the cut-away and into which the tube extends and is connected at 44 by sliding the flexible tube over a molded outlet as in FIG. 2 although now within the enclosed portion 42 as shown in FIG. 1. A suitable pattern of apertures 46 extend through the cup member to dispense hot water to coffee basket 18 below it. In order to prevent water from flowing out of the cup-shaped member except into the coffee basket, an overflow means 48 is supplied centrally of the cup and is a cylindrical dam wall with appropriate overflow slots or openings 50 such that if the rate of flow of heated water into the spreader is greater than the rate of flow through apertures 46, the heated water will rise within the spreader bottom and flow through slots 50 and outwardly through the overflow means and a suitable opening into the coffee basket below to prevent any flow to the internal parts of the coffeemaker located within the hollow vertical leg portion 21. This is substantially the spreader construction described in said U.S. Pat. No. 4,070,956 patent supra.

To relieve steam pressure normally released through the sealed spreader as shown in FIG. 2 except in the basket direction, the cut-away side 40 in FIG. 3 extends substantially 180° around the cup member 38 and is raised from the bottom of the cup member to provide vent means to vent steam either out the top of the coffeemaker or back into the reservoir where its latent heat is reused. To this end, the circular spreader with its cut-away side and its central enclosed portion 42 securing the connected tube 34 forms divided vent passages 52 and 54 that are directed toward the reservoir as seen in FIG. 1. While not necessary, it is preferable that the overflow 48 and the tube securing enclosed portion 42 be disposed centrally for the radial waterflow towards the overflow portion. The entire arrangement is a single molded plastic part separating vent passages 52 and 54. With this construction a separate piece, as shown in FIG. 2, is not required to close the top of the spreader in the customary way. One common single cover 56 of molded plastic is formed with internal ribs 58 that are coextensive with the side 60 of the entire cup 38, the ribs 58 falling outwardly of side wall 60, completing a cover over the vent passages or closure for the spreader and the cut-away portion 40 througout the extent of the spreader. This eliminates the need for a separate gasket and makes the entire assembly less critical to molding defects than a gasket would. Thus, cover 56 serves also as the closure for the spreader removing the need for a separate cover as in said U.S. Pat. No. 4,070,956 patent.

For access to the reservoir, the cover is provided with a spaced removable or pivoted lid 62 directly over the reservoir. The space 63 between the cover and lid, has a plurality of slots 64 that are slanted down towards the reservoir to coact with passages 52 and 54 which are also slanted to their ends 65 parallel to the cover slots so that steam is vented through the slots to the exterior and also directed down into the reservoir. The single cover thus serves multi-functions of enclosing the top of the coffeemaker, enclosing the top of the spreader, and directing steam to vent it outside the coffeemaker or into the reservoir to reduce condensing and dripping at the spreader.

The coffee basket is generally a sliding drawerlike arrangement as described in said U.S. Pat. No. 3,968,740 with spaced parallel guide rails 66 formed on the upper leg below the spreader as shown in FIG. 1, cooperating with matching parallel flanges 68 on the coffee basket so that flanges 68 slide on the rails for support in conventional fashion. In the event of any steam pressure, which is now reduced by the above-described venting construction, that may be used alone for the advantages already described, still there is always the chance that some slight condensation between the rails and flanges over their full length will induce capillary action in the vertical wall area 69 (FIG. 1) between the rails and flanges. To reduce this action flanges 68 have portions 70 cut away. The cut-away portions are conveniently in the form of a scalloped flange so that vertical wall contact occurs only at each spaced scallop 72 to break up the long vertical wall contact and reduce capillary action along the rails and flanges by any condensed steam that is not vented.

The structure thus described provides a single molded cover 56 over the entire coffeemaker that covers the spreader cup member 38, and covers and forms steam vent passages 52 and 54 as well as directing steam out of the coffeemaker through slots 64 thus performing multiple functions while avoiding extra parts. For any steam that might condense in this improved spreader construction, the scalloped edges on the coffee basket remove the capillary action to provide a coffeemaker that is substantially free of water leakage from the coffeemaker all without the addition of extra parts while eliminating the usual extra spreader cover.

While I have hereinbefore described a preferred form of the invention, obvious equivalent variations are possible in light of the above teachings. It is therefore to be understood that, within the scope of the appended claims, the invention may be practiced otherwise than as specifically described and the claims are intended to cover such equivalent variations.

I claim:

1. In an electric drip brewing apparatus having an upright C-shaped housing, the lower horizontal leg having a heated carafe support and the upper leg having a water spreader over a supported coffee basket, the vertical leg enclosing a reservoir with an apertured bottom wall, and a cover over the upper leg with an opening to the reservoir, a pump and heating chamber in the lower leg with a connected tube delivering hot water through a central portion to the spreader, an improvement in said spreader comprising, an open cup-shaped member having a central enclosed portion connecting with said reservoir and having a raised cut-away side towards the reservoir and connected to said tube, apertures in said cup dispensing hot water to the basket, overflow means in said cup, ribs on said cover coextensive with and making a closure for spreader and cut-away side and, with the cover and central portion, forming separate passage means away from the spreader for venting steam, whereby the spreader is closed and vented by the cover to reduce condensing and dripping at the spreader.

2. Apparatus as described in claim 1 wherein said spreader is circular and the cut-away side has an enclosed portion securing said connected tube for water freed to the cup, said central portion forming divided vent passages from the spreader.

3. Apparatus as described in claim 2 wherein the overflow is disposed centrally of the cup and the tube securing portion is centrally of the cut-away for radial water feed towards the overflow.

4. Apparatus as described in claim 3 wherein said cut-away side extends substantially 180° around said cup member.

5. Apparatus as described in claim 4 wherein said cover has a spaced operable lid therein over the reservoir, slanted slots in the space between the lid and cover connecting with said vent passages and cover exterior.

6. Apparatus as described in claim 5 wherein said passages are slanted under the slots substantially parallel therewith to vent through said slots and 7. Apparatus as described in claim 6 wherein spaced parallel guide rails on said upper leg below said spreader and matching scalloped parallel flanges on said coffee basket provide only spaced vertical wall contact between said rails and flanges to reduce capillary action along the rails and supports by any condensed steam not vented.

8. Apparatus as described in claim 1 wherein said upper leg has a pair of spaced parallel guide rails below said spreader, and said coffee basket has matching parallel flanges for sliding support on said rails, said flanges having portions cut away reducing capillary action along said rails and flanges.

9. Apparatus as described in claim 8 wherein each basket flange is scalloped to provide only spaced vertical wall contact between said flanges and rails and reduce capillary action therebetween.

* * * * *

UNITED STATES PATENT AND TRADEMARK OFFICE
CERTIFICATE OF CORRECTION

PATENT NO. : 4,414,884
DATED : November 15, 1983
INVENTOR(S) : James O. McLean

It is certified that error appears in the above-identified patent and that said Letters Patent are hereby corrected as shown below:

Claim 2, line 4. "freed" should be --feed--;

Claim 6, line 3. after "and" insert --also into said reservoir.--

Signed and Sealed this

Twenty-eighth Day of February 1984

[SEAL]

Attest:

GERALD J. MOSSINGHOFF

Attesting Officer    Commissioner of Patents and Trademarks